(12) United States Patent
Cai et al.

(10) Patent No.: US 8,184,628 B2
(45) Date of Patent: May 22, 2012

(54) NETWORK BASED MULTICAST STREAM DUPLICATION AND MERGING

(75) Inventors: Yiqun Cai, Cupertino, CA (US); Toerless Eckert, Mountain View, CA (US); Heidi Ou, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 12/584,008

(22) Filed: Aug. 28, 2009

(65) Prior Publication Data
US 2011/0051727 A1 Mar. 3, 2011

(51) Int. Cl.
*H04L 12/28* (2006.01)

(52) U.S. Cl. .......................... 370/389; 370/401

(58) Field of Classification Search .................. None
See application file for complete search history.

(56) References Cited

U.S. PATENT DOCUMENTS

| | | | |
|---|---|---|---|
| 6,097,720 A | 8/2000 | Araujo et al. | |
| 6,269,080 B1* | 7/2001 | Kumar | 370/236 |
| 7,626,984 B2* | 12/2009 | Napierala | 370/389 |
| 7,830,825 B2* | 11/2010 | Fu et al. | 370/312 |
| 2002/0150094 A1* | 10/2002 | Cheng et al. | 370/389 |
| 2003/0112749 A1 | 6/2003 | Hassink et al. | |
| 2003/0139929 A1* | 7/2003 | He et al. | 704/270.1 |
| 2005/0265284 A1* | 12/2005 | Hsu et al. | 370/331 |
| 2006/0050643 A1 | 3/2006 | Yoshimoto et al. | |
| 2006/0120396 A1 | 6/2006 | Hasegawa et al. | |
| 2006/0221975 A1 | 10/2006 | Lo et al. | |
| 2007/0177593 A1* | 8/2007 | Kompella | 370/390 |
| 2008/0095160 A1* | 4/2008 | Yadav et al. | 370/390 |
| 2008/0101360 A1* | 5/2008 | Napierala | 370/390 |
| 2008/0225850 A1 | 9/2008 | Oran et al. | |
| 2008/0267078 A1 | 10/2008 | Farinacci et al. | |
| 2008/0285452 A1 | 11/2008 | Oran | |
| 2009/0201803 A1 | 8/2009 | Filsfils et al. | |
| 2009/0245248 A1* | 10/2009 | Arberg et al. | 370/390 |
| 2010/0202452 A1* | 8/2010 | Ram et al. | 370/390 |

* cited by examiner

*Primary Examiner* — Hong Cho
(74) *Attorney, Agent, or Firm* — Cindy Kaplan

(57) ABSTRACT

In one embodiment, a method includes receiving a join message from a receiver at a receiver edge router, the join message identifying a source and a group, and creating at least two forwarding trees for transmitting multicast data streams comprising duplicate data to the receiver edge router. The forwarding trees include a root at a source edge router in communication with the source, and different network paths. The method further includes receiving a packet from one of the forwarding trees and processing the received packet to determine if the packet is a duplicate of another packet received at the receiver edge router. If the packet is a duplicate packet, it is discarded. If the packet is not a duplicate, it is forwarded to the receiver. An apparatus is also disclosed.

20 Claims, 5 Drawing Sheets

NETWORK BASED MULTICAST STREAM DUPLICATION AND MERGING

BACKGROUND

The present disclosure relates generally to communication networks, and more particularly, to multicast routing.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission.

Multicast routing is widely deployed and continues to gain popularity with the advent of multimedia programs and the proliferation of Internet applications. Many multicast-based applications require delivery of large amounts of time sensitive and loss sensitive data simultaneously to large audiences. For these applications, a high degree of multicast resilience is desired to provide near-zero packet loss. In order to achieve this resilience, multicast traffic is split into multiple data streams which are sent over diverse paths. In the case of a failure on one path, the multicast traffic is still available via another path. The multiple data streams, however, result in duplicate packets which increase bandwidth usage and need to be properly discarded when the streams merge.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
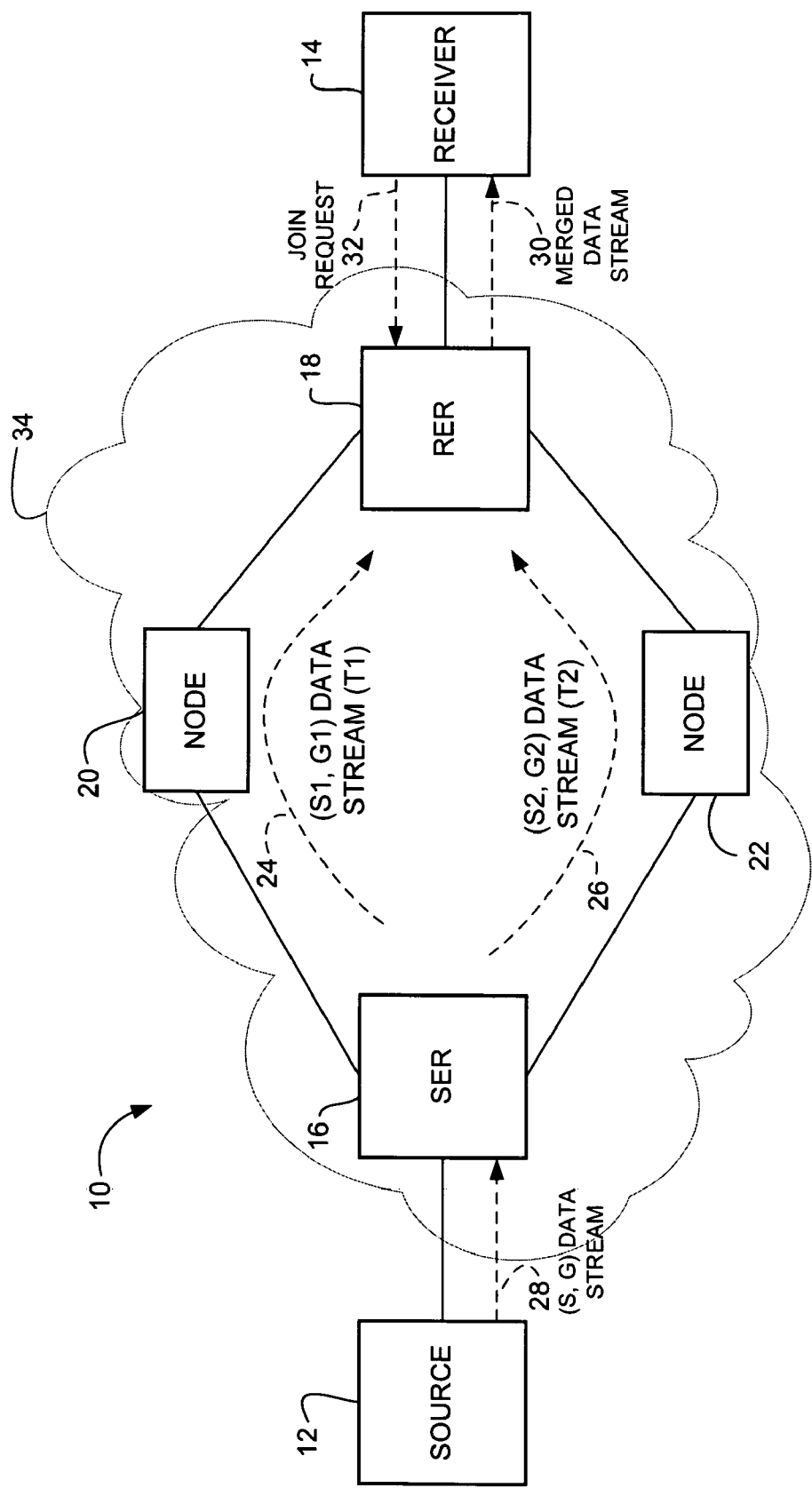
FIG. 1 illustrates an example of a network in which embodiments described herein may be implemented.

In one embodiment, a method generally comprises receiving a join message from a receiver at a receiver edge router, the join message identifying a source and a group, and creating at least two forwarding trees for transmitting multicast data streams comprising duplicate data to the receiver edge router. The forwarding trees include a root at a source edge router in communication with the source and different network paths. The method further includes receiving a packet from one of the forwarding trees and processing the received packet to determine if the packet is a duplicate of another packet received at the receiver edge router. If the packet is a duplicate packet, it is discarded. If the packet is not a duplicate, it is forwarded to the receiver.

In another embodiment, an apparatus generally comprises a processor configured to receive a join message from a receiver, create at least two forwarding trees for transmitting multicast data streams comprising duplicate data to the apparatus, the forwarding trees comprising a root at a source edge router in communication with a source, and different network paths, process a packet received from one of said forwarding trees to determine if the received packet is a duplicate of another received packet, discard the received packet if the packet is a duplicate packet, and forward the received packet to the receiver if the packet is not a duplicate packet. The apparatus further includes memory for storing data from received packets for use in determining if the received packet is a duplicate packet.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the embodiments have not been described in detail.

Networks, such as those for use in transporting digitized television programs, Service Provider (SP) Multicast Virtual Private Network (MVPN) enabled networks that carry IP/TV traffic in Multicast Virtual Route Forwarding (MVRF), or dedicated or MVPN enabled networks for use in delivering market data information, for example, require a high degree of multicast resilience. This is due in part to the sensitivity of applications to packet loss and low latency requirements.

A network that guarantees zero (or near-zero) packet loss in the case of a single network failure is referred to herein as a "live-live" network. This may be accomplished using, for example, an MT (multi-topology) IGP (Interior Gateway Protocol) capable network or different BGP (Border Gateway Protocol) loopbacks (update-source) with separate IGP processes to build diverse paths for multicast. The live-live network may also be created using ECMP (Equal-Cost Multi-Path), MoFRR (Multicast only Fast Reroute), RSVP/TE (Resource Reservation Protocol—Traffic Engineering), or other protocols. The primary traffic in the network is IP multicast. It is to be understood that these networks are only examples and the embodiments described herein may be implemented in different networks, without departing from the scope of the embodiments.

In order to achieve high multicast resilience, duplicate streams of data are sent over diverse paths. The duplicate streams may be transmitted at a source and merged at a receiver. However, this process has drawbacks. For example, in some cases, the Service Provider may have no control over what the source can or will send, thus, it is not desirable to require the source to send multiple streams at all times. Also, the bandwidth available between the SP network and the receiver may be limited.

The embodiments described herein duplicate and merge data streams within a transport network. As described in detail below, the embodiments utilize tunnels within the transport network to transmit the duplicate data streams. This allows the content source to send only one data stream and eliminates the need for the content receiver to merge the streams. The embodiments provide minimum latency and bandwidth for traffic entering and exiting the transport network.

The embodiments described herein operate in the context of a data communication network 10 including multiple network elements (FIG. 1). Some of the elements in a network that employs the embodiments may be routers, switches, gateways, or other network devices. For example, some of the nodes may be specially configured routers such as those available from Cisco Systems, Inc. of San Jose, Calif. As used herein the term router refers to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software. In one embodiment, the network device is implemented on a general purpose network host machine as described below with respect to FIG. 2.

Figure 2:
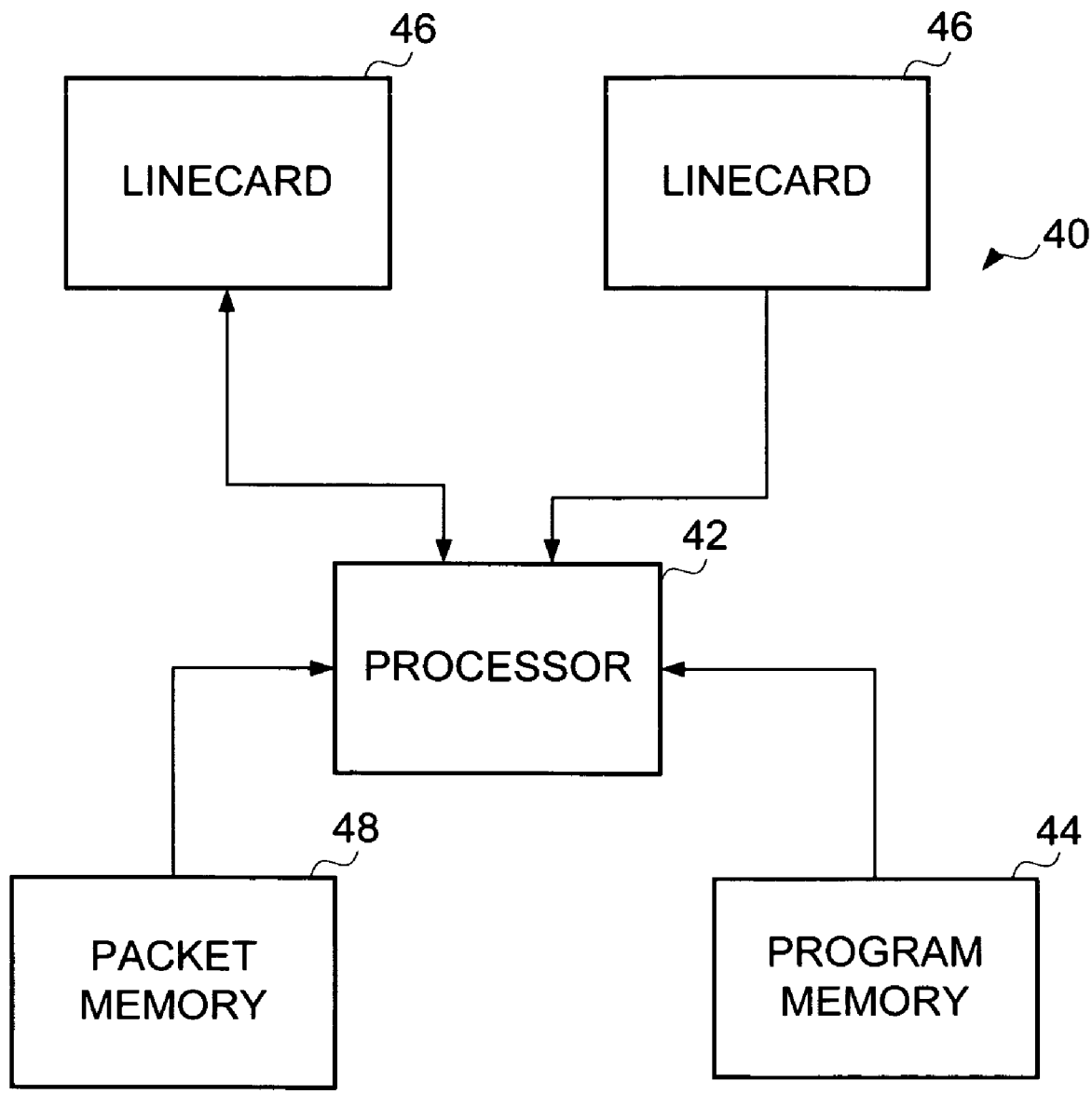
FIG. 2 depicts an example of a network device useful in implementing embodiments described herein.

FIG. 2 depicts a network device 40 that may be used to implement embodiments described herein. Network device 40 is configured to implement all of the network protocols and extensions thereof described herein. In one embodiment, network device 40 is a programmable machine that may be implemented in hardware, software, or any combination thereof. Logic may be encoded in one or more tangible media for execution by a processor. For example, processor 42 may execute codes stored in a program memory 44. Program memory 44 is one example of a computer-readable medium. Program memory 44 can be a volatile memory. Another form of computer-readable medium storing the same codes is a type of non-volatile storage such as floppy disks, CD-ROMs, DVD-ROMs, hard disks, flash memory, etc.

Network device 40 interfaces with physical media via a plurality of linecards (network interfaces) 46. Linecards 46 may incorporate Ethernet interfaces, DSL interfaces, Gigabit Ethernet interfaces, 10-Gigabit Ethernet interfaces, SONET interfaces, etc. As packets are received, processed, and forwarded by network device 40, they may be stored in a packet memory 48. To implement functionality according to the system, linecards 46 may incorporate processing and memory resources similar to those discussed above in connection with the network device as a whole. It is to be understood that the network device 40 shown in FIG. 2 and described above is only one example and that different configurations of network devices may be used.

The network 10 implementing the embodiments described herein is configured to use IP multicast, which simultaneously delivers a stream of information to numerous recipients. A brief discussion of multicast routing is provided to help introduce concepts used in the embodiments described herein.

Multicast operation is based on the concept of a group. A multicast group is an arbitrary group of receivers that expresses an interest in receiving a particular data stream. An IP multicast address, or a portion thereof, specifies a particular group. Hosts (receivers) that are interested in receiving data flowing to a particular group join the group by transmitting a join message, using Internet Group Management Protocol (IGMP) or Multicast Listener Discovery (MLD), for example.

Multicast-capable routers create distribution trees that control the path that IP multicast traffic takes through the network in order to deliver traffic to all receivers. Members of multicast groups can join or leave at any time; therefore the distribution trees are dynamically updated. In one embodiment, Protocol Independent Multicast (PIM) is used to dynamically create a multicast distribution tree to ensure distribution to intended receivers while limiting distribution so that network segments that are not in the path between the source and receivers are not burdened with unnecessary traffic. It is to be understood that PIM is only one example and that other multicast protocols may be used without departing from the scope of the embodiments.

Referring again to FIG. 1, the network 10 includes a source 12, receiver 14, Source Edge Router (SER) 16, Receiver Edge Router (RER) 18, and intermediate nodes 20, 22, connected through communication links. The SER 16 is a network device that is connected to the content source or a network through which the content source can be reached. The RER 18 is a network device that is connected to the receiver or a network via which the receiver can be reached. The SER 16 and RER 18 are preferably located along an edge of transport network 34. The protection domain for multicast is between the SER 16 and RER 18.

Source 12 may be a node (e.g., server, computer, or any other type of network device that can source IP media, such as video, audio, voice, data, etc.) or a network in communication with the source node. The source 12 transmits a multicast data stream 28 to SER 16, which transmits the data stream to one or more receivers 14 over the network 34. The receiver 14 may be a node that receives and stores or renders multicast stream 30, a network in communication with the receiver node, or a gateway to another network. The receiver 14 may be, for example, a computer terminal, personal computer, television with IP interface, Set Top Box (STP), Digital Video Recorder (DVR), Voice over IP (VoIP) phone, cell phone, eQAM (edge Quadrature Amplitude Modulation) device, Personal Digital Assistant (PDA), etc.

As described in detail below, the SER 16 transmits two data streams 24, 26 on tree T1 and tree T2, respectively. Packets for data stream 24 go through intermediate node 20 wherein packets for data stream 26 go through intermediate node 22. The data streams 24, 26 may pass through any number of nodes in transport network 34. The tree topologies T1, T2, preferably have SER-to-RER disjointness. The use of different network paths increases the likelihood that packets from at least one of the two data streams 24, 26 successfully arrive at the RER 18. If the two paths 24, 26 are completely disjoint (i.e., do not share any network segment), the data is protected from any single failure in the transport network 34.

Figure 3:
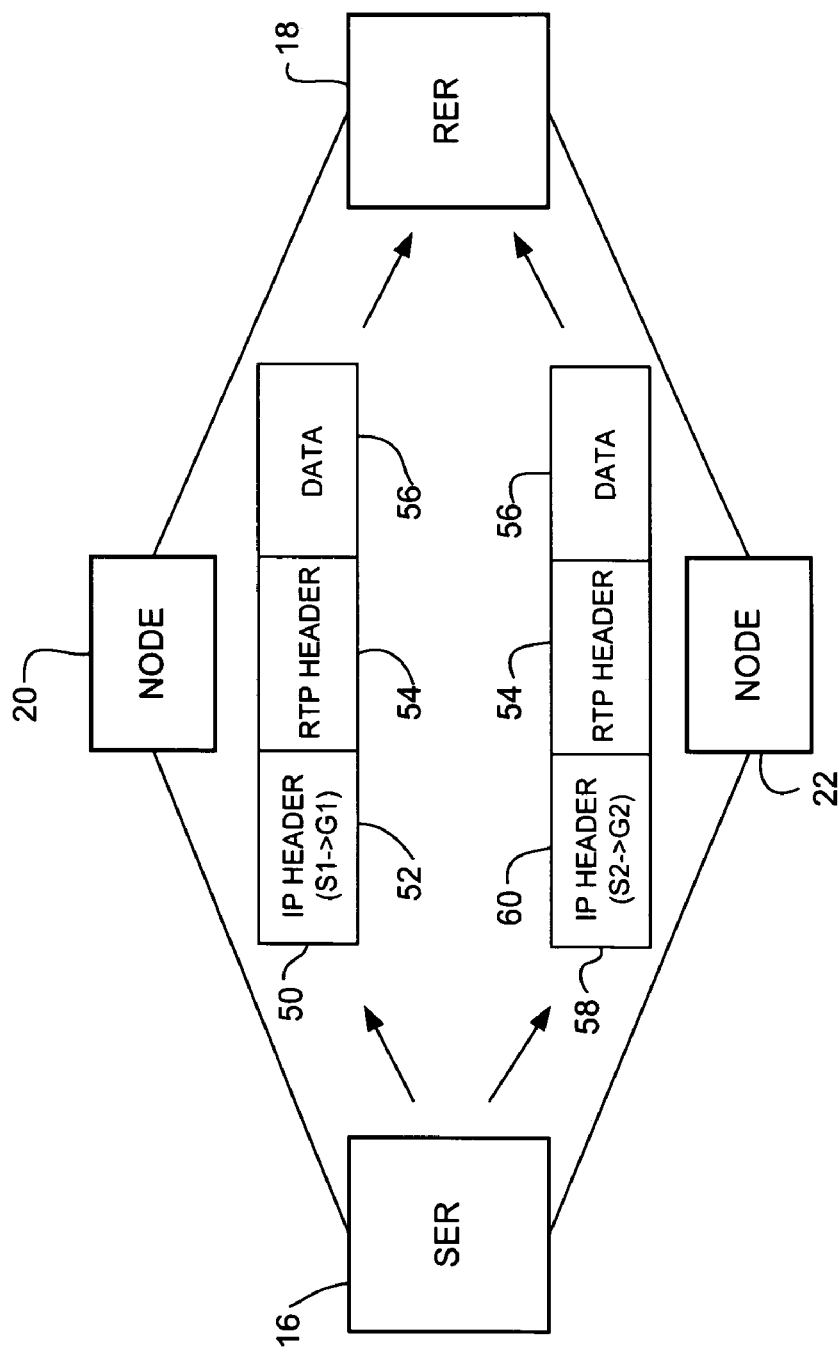
FIG. 3 illustrates data packets transmitted over the network of FIG. 1.

FIG. 3 illustrates an example of multicast data packets 50, 58 sent over the transport network. In one embodiment, the data streams are sent over RTP (Realtime Transport Protocol) tunnels using different IP headers 52, 60, which allows the routing system to differentiate the data streams and send the streams over separate paths. The addresses in the IP headers 52, 60 specify separate multicast groups, as described below. The packets 50, 58 contain the same RTP header 54 and data (payload) 56. Information in the RTP header (e.g., sequence number, timestamp) is used to identify duplicate packets. The RTP header 54 and outer IP header 52, 60 are inserted at the SER 16 and removed at the RER 18. The RTP header 54 may be inserted between the original IP header and payload 56 or a new IP header and RTP header may be used to encapsulate the packet, including its original IP header. If the original IP header is used, the protocol type field, total length field, header checksum, and TTL are preferably modified.

It is to be understood that RTP is only one example of a protocol that may be used. Other protocols, such as GRE (Generic Routing Encapsulation) or L2TPv3 (Layer 2 Tunneling Protocol Version 3), may also be used for encapsulation.

Figure 4:
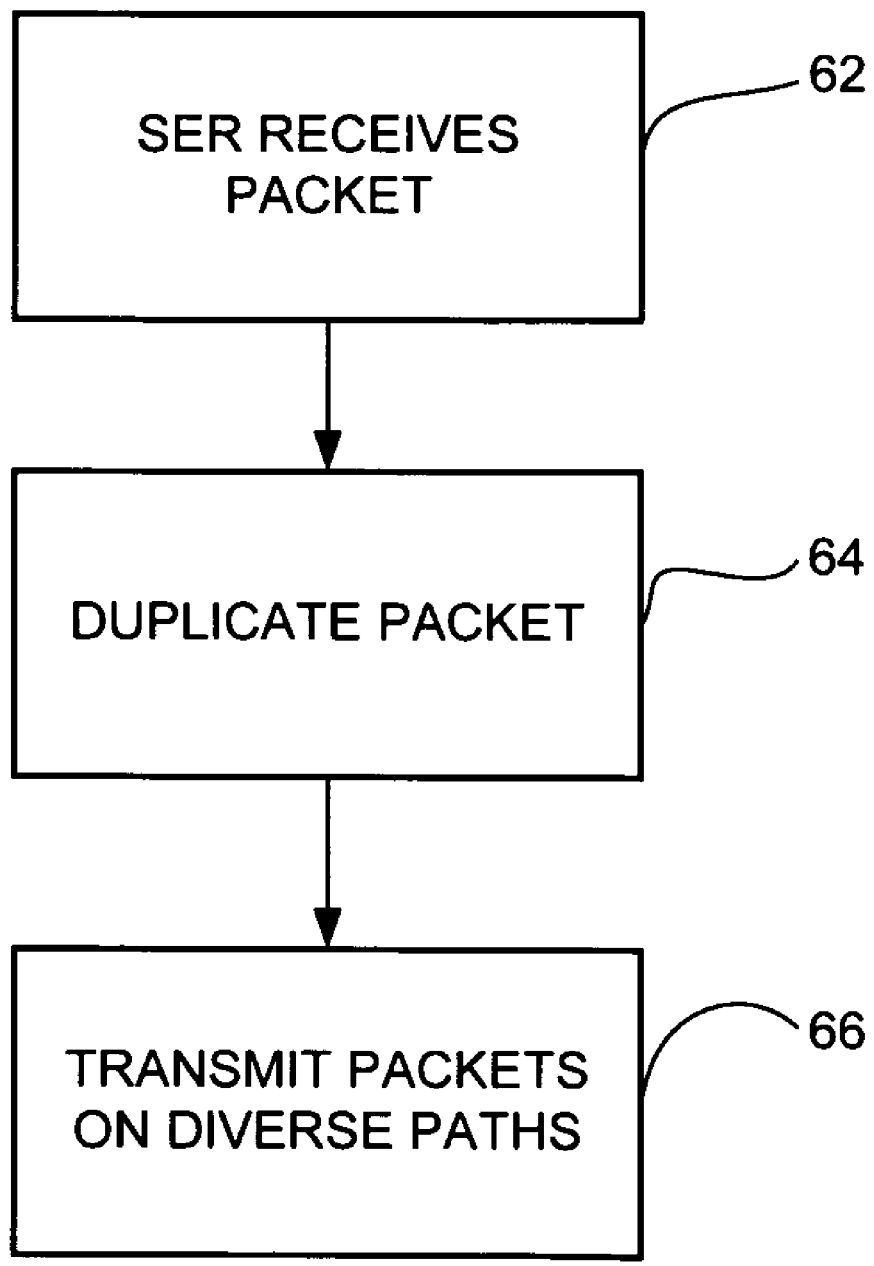
FIG. 4 is a flowchart illustrating a process for multicast stream duplication at a source edge router.
Figure 5:
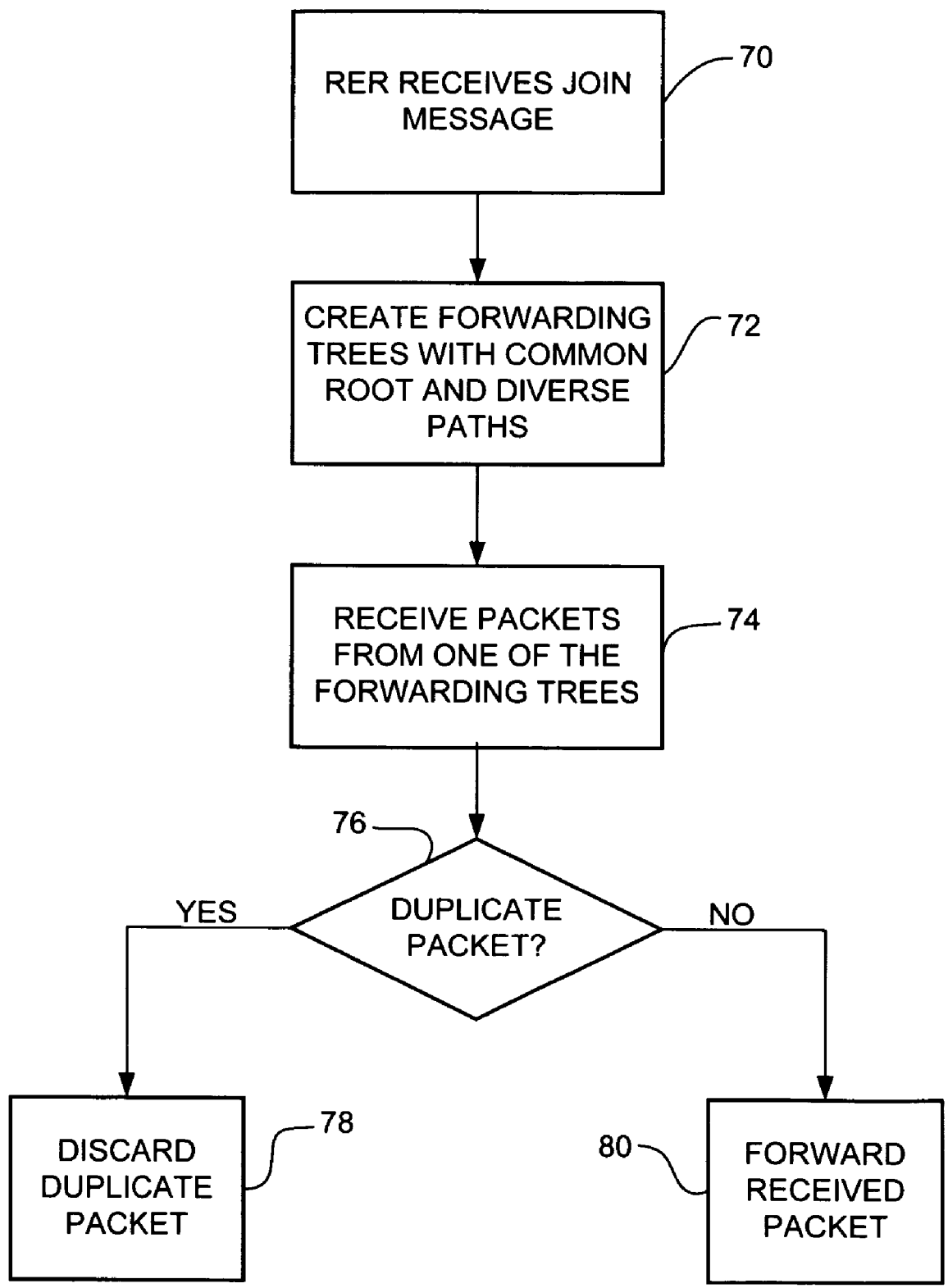
FIG. 5 is a flowchart illustrating a process for setting up diverse paths and merging multicast streams at a receiver edge router.

FIGS. 4 and 5 are flowcharts illustrating an overview of a process for multicast stream duplication and merging in the transport network.

FIG. 4 illustrates operation at the SER 16. At step 62, the SER 16 receives a multicast packet from the source 12 and destined for a group including the receiver 14. The SER 16 duplicates the incoming packets into two or more flows (step 64) and transmits the packets over diverse data paths (step 66). For example, when the SER 16 receives a packet (S->G) (wherein S is a source identifier and G is a group identifier), from the content source 12, it duplicates the packet into two packets 50, 58, each with the same RTP header 54, but different IP headers 52, 60 (e.g., (S1->G1) and (S2->G2)) (FIG. 3). The resulting packets 50, 58 have the same RTP sequence number and timestamp, but different outer IP headers 52, 60. The packets 50, 58 are forwarded along their respective trees (T1, T2) to the RER 18 (FIG. 1).

FIG. 5 illustrates a process at the RER 18 for setting up paths for the multicast data streams and merging duplicate data streams. At step 70, the RER 18 receives a join message 32 from the receiver 14. The join message identifies a group that the receiver 14 wants to join. Forwarding trees are created for transmitting multiple (e.g., two or more) multicast streams (step 72). Each tree comprises a common root (e.g., SER 16) and different network paths. For example, when the RER 18 receives an (S, G) join from the receiver 14, it turns the (S, G) join into two joins (S1, G1) and (S2, G2). (S1, G1) and (S2, G2) are configured such that either S1 or S2 may be the same as S, either G1 or G2 may be the same as G, and (S1, G1) and (S2, G2) are distinguishable from one another. This allows the network to build two forwarding trees for (S1, G1) and (S2, G2) in such a way that the two forwarding trees do not share any network segment and both forwarding trees are rooted at the same SER 16. This provides zero (or near-zero) packet loss in the event of a single failure within the protection domain.

At steps 74 and 76, the RER 18 receives a packet from one of the forwarding trees and determines if the packet is a duplicate of another received packet. If the received packet is a duplicate packet, the RER 18 discards the packet (step 78). If the received packet is not a duplicate packet, the RER 18 forwards the packet to the receiver 14 (step 80).

The following describes one example of a process for identifying duplicate packets at the RER 18. In one embodiment, the RER 18 inspects packets using RTP information in the RTP header 54 to detect and discard duplicate packets. For every (S, G, SER), the RER 18 maintains a base sequence number (SEQ), a timestamp from the router from which the base sequence number is sent, and a window of X. The RER 18 uses this information to detect and discard duplicate packets. If a packet is not a duplicate, its RTP header 54 will be stripped off and the packet forwarded to the receiver 14.

In one example, the base sequence number is 1000 and the window size is 500. A packet arrives with a sequence number 1001, and this sequence number has not been seen by the RER 18. The sequence number 1001 is stored at the RER 18 and the packet is forwarded to the receiver 14. A packet then arrives with a sequence number of 1003. Even though a packet with sequence number 1002 has not been received at the RER 18, as long as a packet with sequence number 1003 has not been received, the packet is forwarded. A packet with sequence number 1002 then arrives at the RER 18. This packet is also forwarded. If another packet arrives at the RER 18 with a sequence number of 1001, 1002, or 1003, it is dropped. If a packet arrives with a sequence number of less than 1000 or larger than 1500, it is forwarded by the RER 18. In one embodiment, the base sequence number is advanced by software.

As can be observed from the foregoing, the embodiments described herein provide numerous advantages. For example, the embodiments allow an "in-the-network" zero (or near-zero) packet loss solution that can handle fragmentation or misordering. An SP or MSO (MultiService Operator) customer can deploy the embodiments without having to depend on traffic behavior of their customer.

Although the method and system have been described in accordance with the embodiments shown, one of ordinary skill in the art will readily recognize that there could be variations made to the embodiments without departing from the scope of the present embodiments. Accordingly, it is intended that all matter contained in the above description and shown in the accompanying drawings shall be interpreted as illustrative and not in a limiting sense.

What is claimed is:

1. A method comprising:
receiving a join message from a receiver at a receiver edge router, said join message identifying a source and a group;
creating at least two forwarding trees for transmitting multicast data streams comprising duplicate data to the receiver edge router, said forwarding trees comprising a root at a source edge router in communication with the source, and different network paths;
receiving a packet from one of said forwarding trees at the receiver edge router;
processing said received packet at the receiver edge router to determine if said received packet is a duplicate of another packet received at the receiver edge router;
discarding said received packet if said received packet is a duplicate packet; and
forwarding said received packet to the receiver if said received packet is not a duplicate packet;
wherein said received packet comprises a Realtime Transport Protocol (RTP) header and wherein determining if said received packet is a duplicate packet comprises examining said RTP header and wherein forwarding said received packet comprises removing said RTP header.

2. The method of claim 1 wherein examining said RTP header comprises comparing a sequence number of said RTP header to sequence numbers of previously received packets.

3. The method of claim 1 wherein said duplicate packets comprise different IP headers and the same RTP header.

4. The method of claim 1 further comprising storing in memory of the receiver edge router, a base sequence number, a timestamp, and a window size.

5. The method of claim 4 further comprising storing in said memory a sequence number for each packet received from said forwarding trees.

6. The method of claim 1 wherein said forwarding trees do not share any network segment.

7. The method of claim 1 wherein creating at least two forwarding trees comprises transmitting two join messages.

8. The method of claim 1 wherein the receiver is a network in communication with a receiver node.

9. The method of claim 1 wherein the source edge router and the receiver edge router are located along an edge of a transport network interposed between the source and the receiver.

10. An apparatus comprising:
a processor configured to receive a join message from a receiver, create at least two forwarding trees for transmitting multicast data streams comprising duplicate data to the apparatus, said forwarding trees comprising a root at a source edge router in communication with a source, and different network paths, process a packet received from one of said forwarding trees to determine if said received packet is a duplicate of another received packet, discard said received packet if said received packet is a duplicate packet, and forward said received packet to the receiver if said received packet is not a duplicate packet; and memory for storing data from said received packets for use in determining if said received packet is a duplicate packet;

wherein said received packet comprises a Realtime Transport Protocol (RTP) header and wherein said processor is configured to examine said RTP header to determine if said received packet is a duplicate packet and remove said RTP header before forwarding said packet.

11. The apparatus of claim 10 wherein said memory further comprises a base sequence number, a timestamp, and a window size.

12. The apparatus of claim 10 wherein said data stored in said memory comprises a sequence number for each packet received on said forwarding trees.

13. The apparatus of claim 12 wherein the processor is configured to compare a sequence number of said received packet to said stored sequence numbers to determine if said received packet is a duplicate packet.

14. The apparatus of claim 10 wherein said forwarding trees do not share any network segment.

15. An apparatus comprising:

means for creating at least two forwarding trees for transmitting multicast data streams comprising duplicate data to the apparatus, in response to receiving a join message from a receiver, said join message identifying a source and a group, said forwarding trees comprising a root at a source edge router in communication with the source, and different network paths;

means for processing a packet received from one of said forwarding trees to determine if said received packet is a duplicate of another packet received at the receiver edge router; and memory for storing a base sequence number and window for use in detecting duplicate packets;

wherein said received packet is discarded if said packet is a duplicate packet and said received packet is forwarded if said received packet is not a duplicate packet.

16. The apparatus of claim 15 wherein said received packet comprises a Realtime Transport Protocol (RTP) header and wherein means for processing said received packet comprises means for examining said RTP header to determine if said received packet is a duplicate packet.

17. The apparatus of claim 16 wherein means for examining said RTP header comprises means for comparing a sequence number of said RTP header to sequence numbers of previously received packets.

18. The apparatus of claim 16 wherein said duplicate packets comprise different IP headers and the same RTP header.

19. The apparatus of claim 15 wherein the memory is further configured for storing a sequence number for each packet received from said forwarding trees.

20. The apparatus of claim 15 wherein said received packet comprises an encapsulated packet.

* * * * *